US009837785B2

(12) United States Patent
Wen et al.

(10) Patent No.: US 9,837,785 B2
(45) Date of Patent: *Dec. 5, 2017

(54) POLARIZATION LASER SENSOR

(71) Applicant: SHENZHEN UNIVERSITY, Shenzhen (CN)

(72) Inventors: Qiao Wen, Shenzhen (CN); Guowen Liang, Shenzhen (CN); Ji Li, Shenzhen (CN); Hanben Niu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,067

(22) Filed: Apr. 27, 2016

(65) Prior Publication Data

US 2016/0238369 A1 Aug. 18, 2016

Related U.S. Application Data

(63) Continuation-in-part of application No. PCT/CN2015/072694, filed on Feb. 10, 2015.

(51) Int. Cl.
*G01C 19/66* (2006.01)
*H01S 3/08* (2006.01)
(Continued)

(52) U.S. Cl.
CPC ...... *H01S 3/08059* (2013.01); *G01B 9/02003* (2013.01); *G01B 9/02023* (2013.01); *H01S 3/083* (2013.01); *H01S 3/08013* (2013.01); *H01S 3/10061* (2013.01); *G01B 2290/70* (2013.01)

(58) Field of Classification Search
CPC ........ H01S 3/00; H01S 3/083; H01S 3/08013; G01C 19/66; G01C 19/72
See application file for complete search history.

(56) References Cited

U.S. PATENT DOCUMENTS

| 5,398,256 A * | 3/1995 | Hohimer ............... H01S 5/1071 372/46.01 |
| 2004/0179559 A1* | 9/2004 | Butterworth ............ H01S 3/083 372/21 |
| 2016/0238392 A1* | 8/2016 | Wen .................... H01S 3/06791 |

FOREIGN PATENT DOCUMENTS

| CN | 201622111 | 11/2010 |
| CN | 103335979 | 10/2013 |

(Continued)

*Primary Examiner* — Jonathan Hansen
(74) *Attorney, Agent, or Firm* — Hamre, Schumann, Mueller & Larson, P.C.

(57) ABSTRACT

Systems and apparatuses for a polarization laser sensor are disclosed. The polarization laser sensor can include a pump source, a common section, a reference section and a detection section. The common section is provided with a gain medium, and the detection section is provided with a sensing element configured to cause an optical path difference. The reference section and the detection section are connected to the common section though a first polarization splitting unit and a second polarization splitting unit. The common section is provided with an output unit or each of the reference section and the detection is provided with the output unit, the output unit is connected to a photoelectric detector through a light uniting unit, and a polarization rotation unit is disposed between the light uniting unit and the output unit.

13 Claims, 7 Drawing Sheets

(51) Int. Cl.
*H01S 3/10* (2006.01)
*H01S 3/083* (2006.01)
*G01B 9/02* (2006.01)

(56) References Cited

FOREIGN PATENT DOCUMENTS

| | | |
|---|---|---|
| CN | 103852092 | 6/2014 |
| CN | 104634370 | 5/2015 |
| CN | 104655159 | 5/2015 |
| CN | 204535728 | 8/2015 |
| CN | 204535729 | 8/2015 |
| WO | 2008/047329 | 4/2008 |

* cited by examiner

POLARIZATION LASER SENSOR

The invention belongs to the technical field of optical sensing, in particular to a sensor based on laser.

BACKGROUND

In the existing technology, small changes in physical quantities such as length, temperature, refractive index, pressure and so on are usually measured through the laser phase interferometry. A Mach-Zehnder interferometer based sensor is a common sensor making use of the laser phase interferometry for measuring. The measuring principle comprises dividing the laser beam output from laser into two beams which respectively come into the two arms of the interferometer; uniting the two beams having passed different transmission paths to form interference; detecting the phase difference of the two beams by a detector; and determining the measured physical quantity. Because the amounts of optical paths of the two arms can be affected by external conditions such as temperature, pressure and so on, the Mach-Zehnder interferometer can finish the measurement of physical quantities such as strain and temperature, and is the important physical basis of many sensors. But such sensor detects the phase difference of two beams of laser, the detection precision and sensitivity is still limited and it needs to provide a new type sensor of high precision and high sensitivity.

SUMMARY

The present invention aims at providing a sensor based on laser, to improve the measurement precision and sensitivity.

The present invention is implemented by an sensor based on laser, comprising a pump source, a common section, and a reference section and a detection section which are connected to the two ends of the common section in parallel, wherein the common section is provided with a gain medium, and the detection section is provided with a sensing element capable of causing an optical path difference;

wherein one end of each of the reference section and the detection section is connected to the common section though a first polarization splitting unit, another end of each of the reference section and the detection section is connected to the common section though a second polarization splitting unit; the common section and the reference section constitute a first laser resonator transmitting a first linearly polarized light, and the common section and the detection section constitute a second laser resonator transmitting a second linearly polarized light;

the common section is provided with an output unit or each of the reference section and the detection section is provided with the output unit, the output unit is connected to a photoelectric detector through a light uniting unit, lasers are output from the output unit, and are united and transmitted to the photoelectric detector; a polarization rotation unit configured for the consistency of the polarization states of the first linearly polarized light and the second linearly polarized light is disposed between the light uniting unit and the output unit.

The sensor of the present invention comprises two laser resonators with different polarization states, the two laser resonators share the common section comprising the same gain medium, and the detection section is provided with the sensing element capable of causing an optical path difference; sensing the physical quantities by the sensing element leads to the change of the laser frequency transmitted in the second laser resonator, which generates a frequency difference between first and second lasers, a heterodyne interference is generated by the two lasers with different frequencies, the amounts of physical quantities are determined by detecting the frequency difference; and because the frequencies of the laser oscillations are sensitive to the changes of the optical paths in the resonators, the sensitivity and accuracy of the sensor are much higher than the traditional sensor based on the phase difference; and the two resonators of the sensor have common optical path, the changes of the common section caused by the external environment lead to basically the same frequency changes for the two resonators, therefore the detection of the frequency difference can offset such changes, such that the sensor has good anti-jamming capacity and is suitable for measuring the small changes in a variety of physical quantities.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiment described herein is merely used to explain the present invention but is not used to limit the present invention to it.

Figure 1:
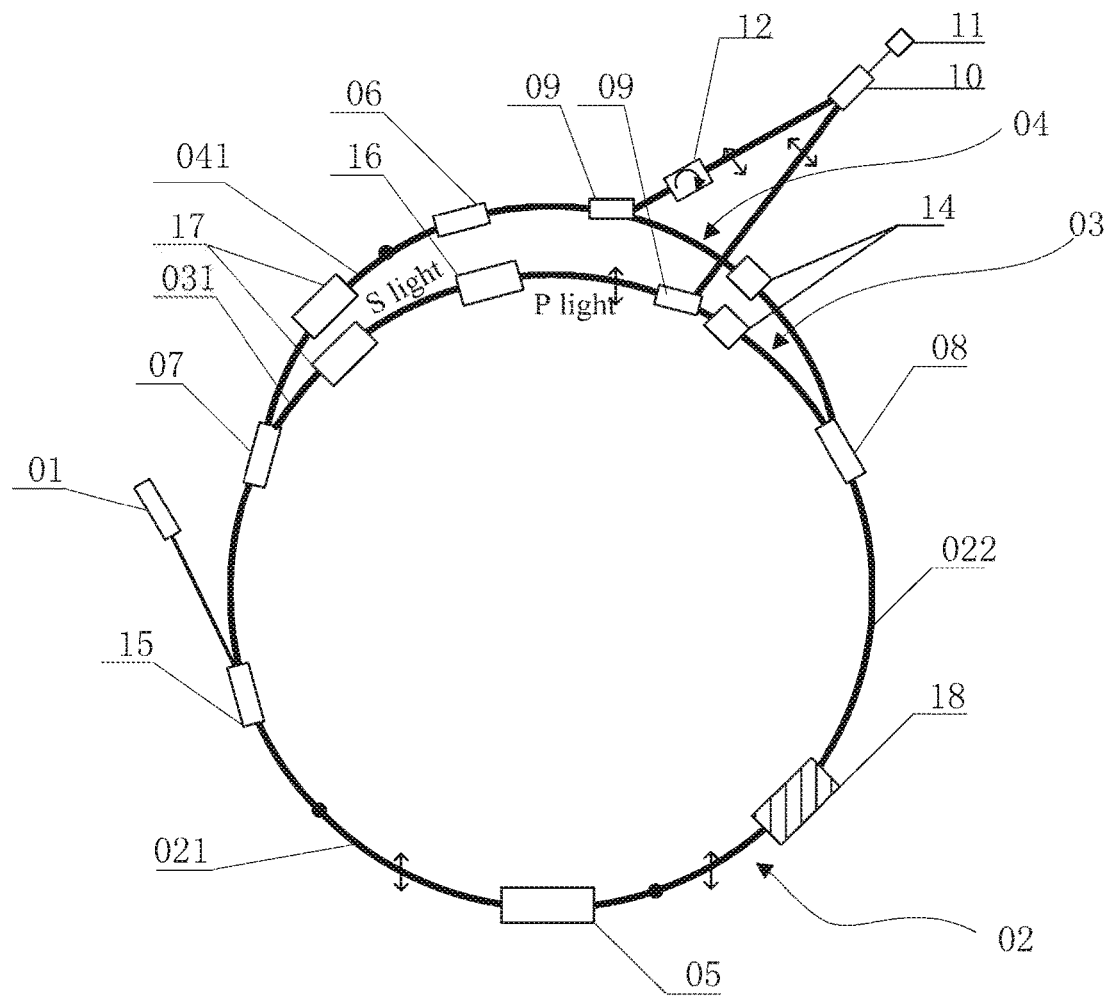
FIG. 1 is a schematic structure view of the sensor based on laser according to the first embodiment of the present invention.
Figure 2:
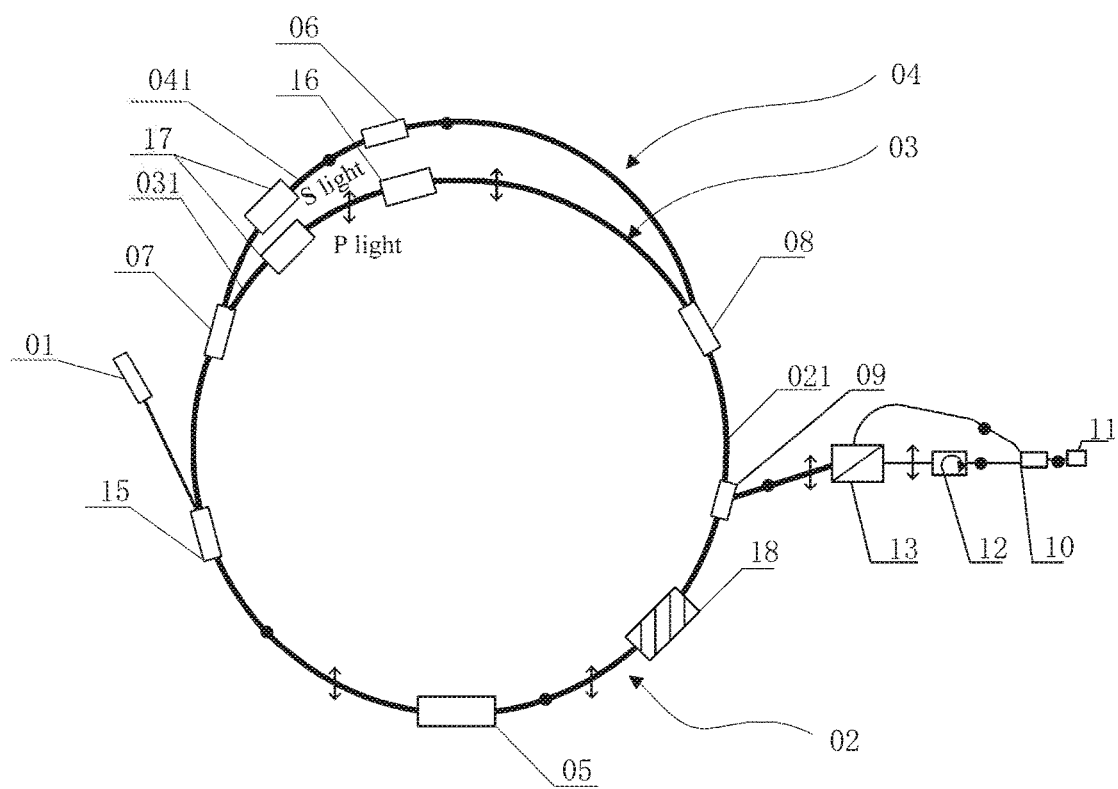
FIG. 2 is another schematic structure view of the sensor based on laser according to the first embodiment of the present invention.

The following specific examples of the specific implementation of the invention are described in detail:

Referring to FIG. 1 and FIG. 2, the embodiment of the present invention provides a sensor based on laser, comprising a pump source 01, a common section 02, a reference section 03 and a detection section 04, the reference section 03 and the detection section 04 are connected to the two ends of the common section 02 in parallel, wherein the common section 02 is provided with a gain medium 05, and the detection section 04 is provided with a sensing element 06 capable of causing an optical path difference. One end of each of the reference section 03 and the detection section 04 is connected to the common section 02 though a first polarization splitting unit 07, another end of each of the reference section 03 and the detection section 04 is connected to the common section 02 though a second polarization splitting unit 08. Each of the first polarization splitting unit 07 and the second polarization splitting unit 08 may divide an incident light into a first linearly polarized light and a second linearly polarized light which have different polarization directions, the common section 02 and the reference section 03 constitute a first laser resonator transmitting the first linearly polarized light, and the common section 02 and the detection section 04 constitute a second laser resonator transmitting the second linearly polarized light; the common section 02 is provided with an output unit 09 or each of the reference section 03 and the detection section 04 is provided with the output unit 09, the output unit 09 is connected to a photoelectric detector 11 through a light uniting unit 10, a polarization rotation unit 12 configured for the consistency of the polarization states of the first linearly polarized light and the second linearly polarized light, is disclosed between the light uniting unit 10 and the photoelectric detector 11. The lasers are output from the output unit 09, one of the first linearly polarized light and the second linearly polarized light passes the polarization rotation unit 12 and then has the same polarization direction with the other linearly polarized light, both of the first linearly polarized light and the second linearly polarized light with the same polarization direction are united by the light uniting unit 10 and are transmitted to the photoelectric detector 11 for interference detection.

For convenience, in the embodiments of the present invention, the first linearly polarized light is denoted by the P light, and the second linearly polarized light is denoted by the S light, namely, the P light is used as the reference light and the S light is used as the detection light.

The working principle of the sensor is that: the pump light emitted by the pump source 01 enters the common section 02, and the gain medium 05 is stimulated to emit excited light to both sides, the excited light is divided into S light and P light by the first polarization splitting unit 07, and the P light enters the reference section 03, the S light enters the detection section 04, the physical quantity to be measured acts on the sensing element 06 on the detection section 04 to change the length of the second laser resonator, such that the frequency of the S light is changed, while the frequency of the P light doesn't change because the length of the first laser resonator doesn't change; therefore the lasers in the first laser resonator and the second laser resonator generate the frequency difference with respective to the change of the optical path caused by the outside world through the sensing element 06, two lasers with different frequencies in the two resonators are output by the Output unit 09 and the heterodyne interferometer is generated, and the interference pattern is detected by the photoelectric detector to obtained the frequency difference between the two lasers, and the amount of the measured physical quantity may be determined according to the frequency difference. Specifically, in the first laser resonator, the laser frequency is $$v_1 = q\frac{C}{L_1},$$

in the second laser resonator, the laser frequency is $$v_2 = q\frac{C}{L_2},$$

where C is the speed of light, longitudinal modulus q is an integer, $L_1$ and $L_2$ are the optical paths of the first laser resonator and the second laser resonator. Because the optical path difference between the two resonators caused by the change of the optical path caused by the sensing element 06, is $\Delta L=L_1-L_2$. Therefore, in the formula $$\Delta v = \left(\frac{v}{L}\right)\Delta L = \frac{C}{\lambda L}\Delta L$$

for the frequency difference, L is the average of the optical paths of the first and the second laser resonators, v is the average of the frequencies of the first and the second laser resonators, λ is the wavelength of the optical resonator. The speed of light C in the numerator of the formula is a large value, while λ in the denominator is a small value. Therefore when the optical path has small change, the frequency difference will have great changes because the numerator has great value and the denominator has very small value. Therefore, the sensitivity and detection accuracy of the sensor are obviously higher than those of the traditional sensor (Mach-Zehnder interferometer and so on), and the two resonators of the sensor have common optical path, the changes of the common section 02 caused by the external environment lead to basically the same frequency changes for the two resonators, therefore the detection of the frequency difference can offset such changes, so that the sensor is affected little by the external environment, has good anti-jamming capacity and is suitable for measuring the small changes in a variety of physical quantities.

The first laser resonator and the second laser resonator in the embodiment of the invention may not only be with a straight cavity structure, but also may be with an ring cavity structure. The following specific examples of the present invention are described in detail:

First Embodiment

The first laser resonator and the second laser resonator are ring cavities. In the common section 02, the reference section 03 and the detection section 04, a polarization-maintaining optical fiber is used for transmission. The common section comprises a common optical fiber 021, the reference section 03 comprises a reference optical fiber 031, the detection section 04 comprises a detection optical fiber 041, and the sensing element capable of causing an optical path difference is disposed on the detection optical fiber 041. Two ends of the common optical fiber 021 are respectively connected to the detection optical fiber 041 through the first polarization splitting unit 07 and connected to the reference optical fiber 031 through the second polarization splitting unit 08 (the polarization coupler is used as the polarization splitting unit in this embodiment). The common optical fiber 021 is provided with a wavelength division multiplexer 15. Each of the detection optical fiber 041 and the reference optical fiber 031 and is provided with the output unit 09, the output unit 09 may be the output coupler. Two output couplers are connected to the light uniting unit 10, and the light uniting unit 10 is connected to the photoelectric detector 11, the polarization rotation unit 12 is disposed between the light uniting unit 10 and the output coupler.

The working principle of the sensor is that: the pump light enters the common optical fiber 021 though the wavelength division multiplexer 15, the gain medium 05 is stimulated to emit excited lights to both sides, the clockwise excited light passes the first polarization splitting unit 07 and is divided into S light and P light, and the P light enters the reference optical fiber 031, the S light enters the detection optical fiber 041, the counterclockwise excited light passes the second polarization splitting unit 08 and is divided into S light and P light, and the P light enters the reference optical fiber 031, the S light enters the detection optical fiber 041, such that two lights with opposite transmission directions are transmitted in the first laser cavity and the second laser cavity, two S lights with opposite transmission directions are transmitted in the reference optical fiber 031, two P lights with opposite transmission directions are transmitted in the detection optical fiber 041. The sensor with such structure can process detection though the interference of S light and P light with the opposite directions and can also process detection by the interference of S light and P light with the same direction, the detection manner is determined mainly according to the output mode.

As one output mode, two output couplers may be used as the output units, one output coupler outputs clockwise S light (or P light), the other output coupler outputs counterclockwise P light (or S light), the interference is generated by two counter lasers which are transmitted oppositely.

In other embodiments, the output unit 09 may be disposed on the common optical fiber 021, the output unit 09 is specially a coupler having four ports or three ports. As shown in FIG. 2, one output coupler is disposed on the common optical fiber 021, the coupler has one output portion, the output portion is connected to a third polarization splitting unit 13 which divides the light the light into S light and P light, the polarization rotation unit 12 is disposed on the optical path of the S light or P light to make polarization states of the two lights be consistent, and the two lights pass though the light uniting unit 10 and enter the photoelectric detector 11.

In the embodiments of the present invention, the common optical fiber 021 is used as the common section of the two resonators, because the lasers in the two resonators will result in mutual coupling, for example, when the interference is made by opposite lasers, all of the lasers in clockwise resonator and counterclockwise resonator pass the common section, backscattering of the lasers are unavoidable during transmission, the backscattering laser inevitably joints the laser in the other optical path, such that the backscattering lights of the two lasers mutually couple into the counter-propagating laser in the common section, the mutual coupling will lead to decrease of the frequency difference of the two lasers, which leads to a more difficult detection, and decreased sensitivity. Therefore, the length of the common optical fiber 021 should not be too long, in order to reduce the coupling between two lasers, thereby avoiding the occurrence of a lock-in similar to laser gyro.

In the embodiments of the present invention, the interference of the laser in the same direction or the opposite directions may be achieved, the application thereof is more flexible. When the interference is generated by the lights in the same direction, the common optical fiber 021 may be provided with one isolator, or each of the detection optical fiber 041 and the reference optical fiber 031 may be provided with the isolator in the same direction. When the interference is generated by the lights in opposite directions, each of the detection optical fiber 041 and the reference optical fiber 031 may be provided with the isolator 14 in the opposite direction, to isolate the laser in the unwanted direction in each section. Using the isolator 14 may avoid the opposite lasers from producing back scattering lights effecting on the desired laser, which further improves the detection accuracy.

In this embodiment of the present invention, the gain medium 05 may be connected to a common optical fiber 021 in the form of doped fiber, and may also be connected to the common optical fiber 021 in the form of single gain device. The number of the wavelength division multiplexer 15 and the pump source 01 may one or two, two wave division multiplexer 15 are respectively arranged between the gain medium 05 and the first polarization coupler and between the gain medium 05 and the second polarization coupler, each wave division multiplexer 15 is respectively connected to one pumping source 01. Such structure may improve the laser power.

Furthermore, there is an initial optical path difference between the first laser resonator and the second laser resonator. In order to compensate for the initial optical path difference, the reference optical fiber 031 may be provided with a delay unit 16, the delay unit 16 may be fiber delayer, to make the optical path difference as small as possible, to facilitate the detection by the photoelectric detector.

Furthermore, the laser transmitted in the resonator will have a loss, in order to avoid the light energies in the first laser resonator and the second laser resonator having too much difference, each of the reference optical fiber 031 and the detection optical fiber 041 may be provided with an adjustable attenuation unit 17, or only the reference optical fiber 031 or the detection optical fiber 041 is provided with the adjustable attenuation unit 17. When the light intensity of one laser is low, the light intensity difference of the two lasers may be reduced by adjusting the adjustable attenuation unit 17.

Furthermore, the common optical fiber 021 may be provided with a single frequency acquisition unit 18, or each of the reference optical fiber 031 and the detection optical fiber 041 may be provided with the single frequency acquisition unit 18, to make the first laser resonator and the second laser resonator transmit the laser with single frequency, thereby improving the contrast of the interference fringe. Furthermore, the single frequency acquisition unit 18 may be a narrow band filter, and also may be a unit formed by two collimator lenses and an F-P interferometer between the two collimator lenses, and the space between the two collimator lenses are free space.

Second Embodiment

Figure 3:
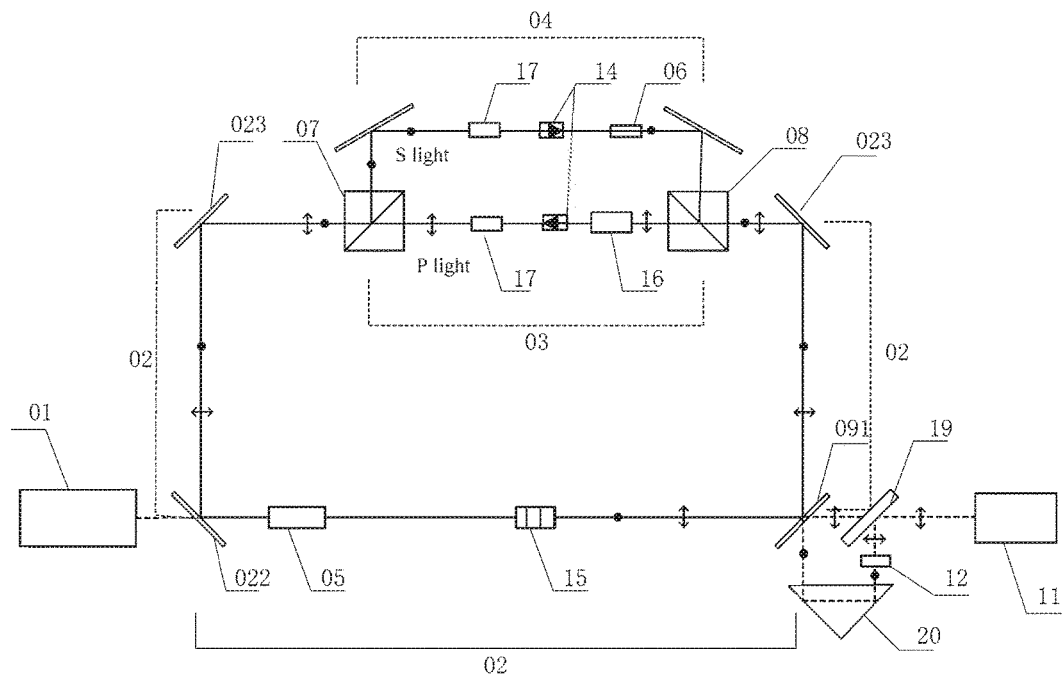
FIG. 3 is a schematic structure view of the sensor based on laser according to the second embodiment of the present invention.

The first laser resonator and the second laser resonator in this embodiment are ring cavities. Referring to FIG. 3, in the common section 02, detection section 04 and reference section 03 of the sensor, a free space is used for transmission. The common section 02 comprises a dichroic mirror 022, and a plurality of reflector 023 and an output mirror 091 serving as output unit 09, the dichroic mirror 022 is disposed on the output direction of the pumping source 01. The dichroic mirror 022, reflectors 023 and output mirror 091 constitute an ring optical path, the first polarization splitting unit 07 and the second polarization splitting unit 08 are disposed between two reflectors 023. The first polarization splitting unit 07 and the second polarization splitting unit 08 may be polarization splitting elements, to divide the incident light into S light and P light with different polarization directions. The S light serves as the detection light and is reflected to the second polarization splitting unit 08 by the reflector 023, the P light served as a reference light directly transmits to the second polarization light splitting unit 08.

The sensing element 06 is arranged on the optical path of the S light. A half-reflecting mirror 19 and a prism 20 are respectively disposed on two different output directions of the output mirror 091, the prism 20 may reflect the incident light to the half-reflecting mirror 19. The polarization rotation unit 12 may be disposed between the output mirror 091 and the half-reflecting mirror 19, or between the output mirror 091 and the prism 20, or between the prism 20 and the half-reflecting mirror 19. The photoelectric detector is disposed on the emitting direction of the half-reflecting mirror 19. Such polarization state of output lights is suitable for the detection of the interference generated by the opposite S light and P light.

The working principle of this embodiment is that: the pump light emitted by the pump source enters the common section 02 though the wavelength division multiplexer 15, the gain medium 05 is stimulated to emit excited lights to both sides, the clockwise excited light passes the first polarization splitting unit 07 and is divided into S light and P light, and the P light enters the reference section 03, the S light enters the detection section 04, the P light joins the S light at the second polarization splitting unit 08 and become a beam of light which enters the common section 02. The counterclockwise excited light passes the second polarization splitting unit 08 and is divided into the S light and P light, and the P light enters the reference section 03, the S light enters the detection section 04, the P light joins the S light at the first polarization splitting unit 07 and become a beam of light which enters the common section 02. The sensors are two ring optical resonators with opposite transmission directions. The output mirror 091 respectively outputs the clockwise laser and the counterclockwise laser, the S light of one laser interfere with the P light of another laser. As shown in FIG. 3, the clockwise S light passes the output mirror 091 and is reflected by the prism 20 to the half-reflecting mirror 19, the counterclockwise P light passes the output mirror 091 and directly enters to the half-reflecting mirror 19, the S light becomes P light after passing the polarization rotation unit 12, the two P lights join together at the half-reflecting mirror 19 and become a beam of light to be detected by the photoelectric detector 11.

Figure 4:
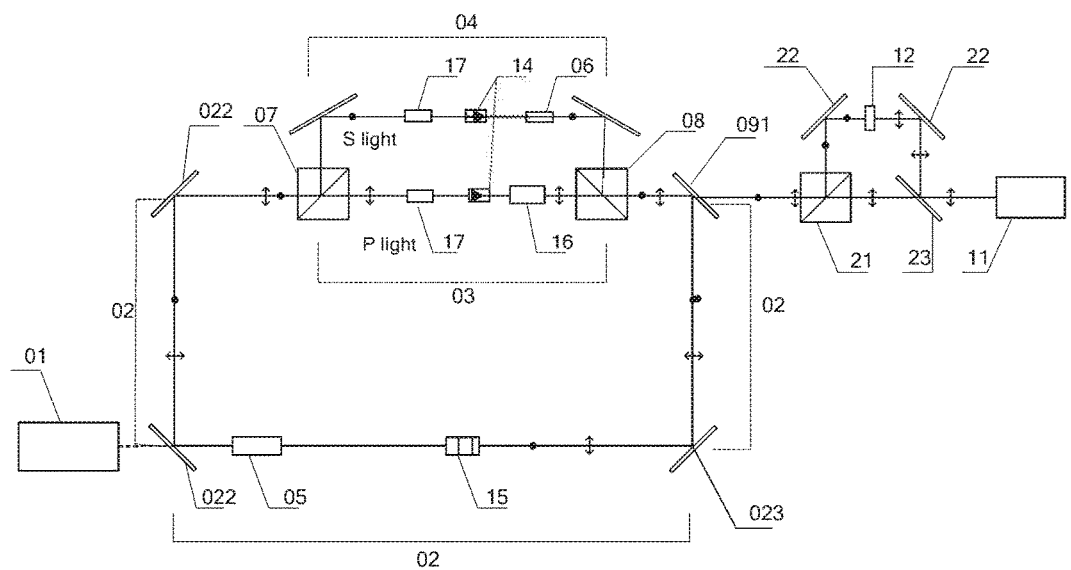
FIG. 4 is a schematic structure view of the sensor based on laser according to the third embodiment of the present invention.

In other embodiments, for example, as shown in FIG. 4, a third polarization splitting unit 21 may be disposed on the output direction of the output mirror 091, a plurality of reflectors 22 and the polarization rotation unit 12 is disposed on the S light reflecting optical path of the third polarization splitting unit 21, and a second half-reflecting mirror 23 is disposed on the P light reflecting optical path of the third polarization splitting unit 21, the photoelectric detector 11 is disposed on the emitting direction of the second half-reflecting mirror 23. It should be understood that the polarization rotation unit 12 may also be disposed on the transmission optical path of the P light. This polarization state of output lights is suitable for the interference detection of the S light and P light in the same direction.

When the S light and P light in the opposite directions are used for detection, the reference section 03 and the detection section 04 may be provided with the isolator 14, which is identical to the first embodiment. The isolator 14 also may avoid the unwanted backscattering lights of the opposite lasers from effecting on the desired laser, thereby ensuring the accuracy and the precision of the detection. When the S light and P light in the same direction are used for the detection, the isolator 14 may be respectively disposed on the in reference section 03 and the detection section 04, or disposed on the common section 02.

In the embodiments of the present invention, each of the reference section 03 and the detection section 04 provided with one adjustable attenuation unit 17, or only the reference section 03 or the detection section 04 is provide with one adjustable attenuation unit 17; the reference section 03 may be provide with the delay unit 16; each of the reference section 03 and the detection section 04 may he provided with one single frequency acquisition unit 18, or the common section 02 may be provided with the single frequency acquisition unit 18. The above devices and the devices in the first embodiment function identically, which will not be repeated in this embodiment.

Third Embodiment

The first laser resonator and the second laser resonator in this embodiment are ring cavities. Referring to FIG. 4, in the common section 02 of the sensor, the free space is used for transmission; in the detection section 04 and reference section 03 of the sensor, the polarization-maintaining optical fiber is used for transmission. The common section 02 is connected to the reference section 03 and the detection section 04 through the first polarization splitting unit 07 and the second polarization splitting unit 08. The common section 02 comprises the dichroic mirror 022, and a plurality of reflector 023 and the common section 02 is provided with the output mirror 091. The output direction of the output mirror 091 may be provided with the third polarization splitting unit 21, the reflecting optical path of the S light of the third polarization splitting unit 21 is provided with a plurality of reflectors 22 and the polarization rotation unit 12, the transmission optical path of the P light of the third polarization splitting unit 21 is provided with the half-reflecting mirror 23, the photoelectric detector 11 is disposed on the emitting direction of the half-reflecting mirror 23. Such components are arranged in the same manner as the second embodiment. The reference section 03 and the detection section 04 respectively comprise the reference optical fiber 031 and the detection optical fiber 041, and the reference optical fiber 031 and the detection optical fiber 041 are provided with the same corresponding components as in the first embodiment, such arrangement is not described in detail in this embodiment. Furthermore, the first polarization splitting unit 07 and the second polarization splitting unit 08 are connected to a collimation focusing mirror group 024 by a section of optical fiber, to realize the optical path transmission between the free space and the polarization maintaining optical fiber.

In this embodiment, each of the reference fiber 031 and the detection optical fiber 041 is provided with an output coupler, one of the output couplers is connected to the polarization rotation unit 12 for consistency of the polarization states of the lights output by the two output couplers.

Certainly, in this embodiment of the present invention, the common section 02 may also be provided with the output unit 09, as described in the second embodiment, the illustration is not repeated here.

In the embodiment of the present invention, the detection section 04 and the reference section 03 may be provided with the adjustable attenuation unit 17, the reference section 03 may be provided with the delay unit 16, the common section 02 may be provided with the single frequency acquisition unit 18, or in test section 04 and reference section 03 are respectively provided with a single frequency acquisition unit 18, each component plays the same role herein as in the first embodiment and the second embodiment, which will not be repeated in this embodiment.

Fourth Embodiment

Figure 5:
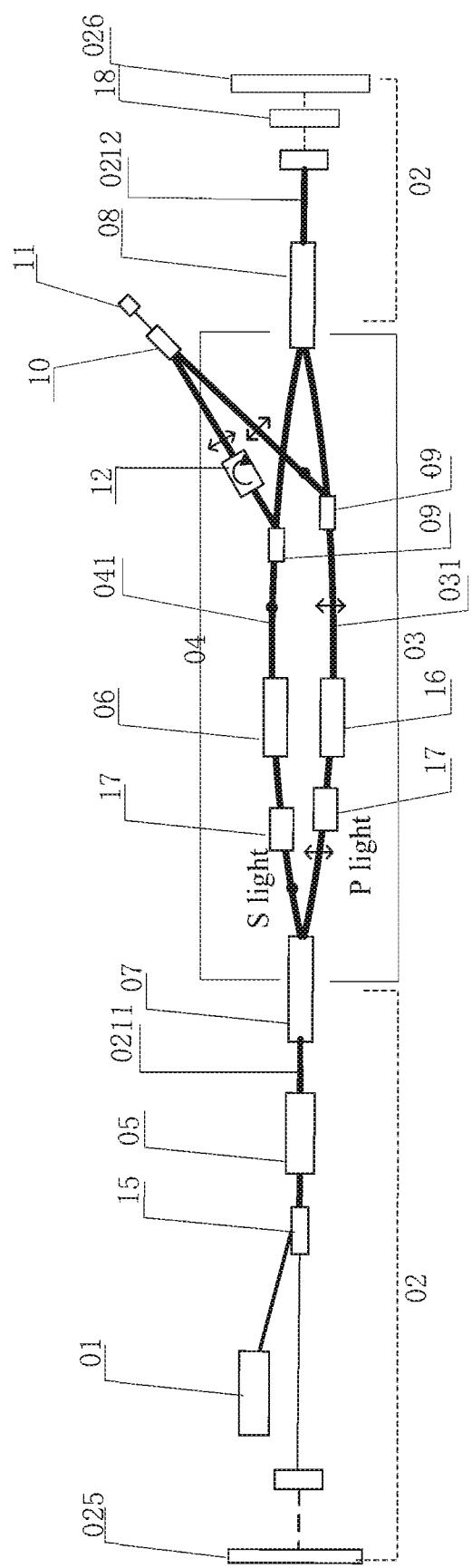
FIG. 5 is a schematic structure view of the sensor based on laser according to the fourth embodiment of the present invention.
Figure 6:
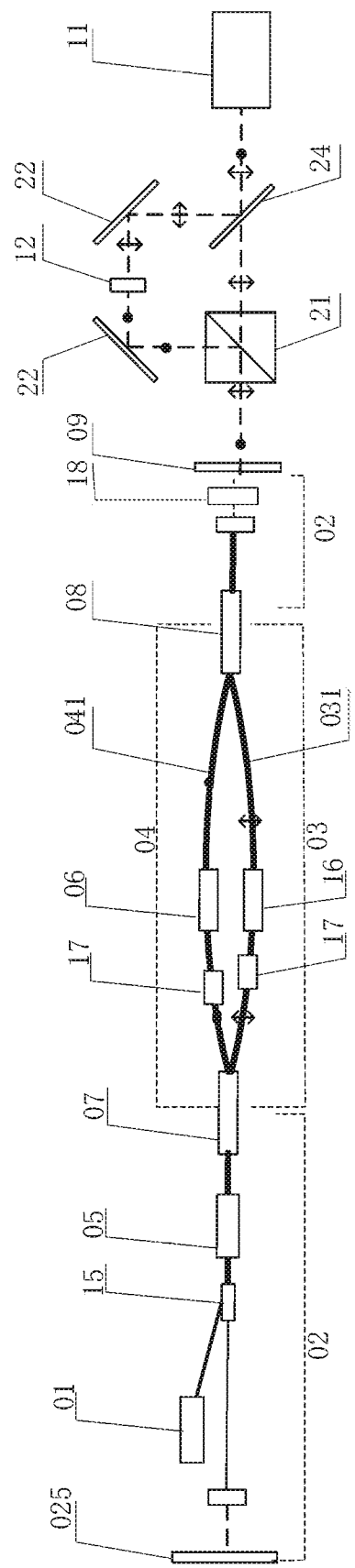
FIG. 6 is another schematic structure view of the sensor based on laser according to the fourth embodiment of the present invention.

The first laser resonator and the second laser resonator in this embodiment are straight cavities. As shown in FIG. 5 and FIG. 6, the pump source 01 and the common section 02 are shown, the common section 02 comprises a first common section and a second common section, the gain medium are disposed on the first common section 02, two ends of each of the reference section 03 and the detection section 04 are connected between the first common section and the second common section in parallel through the first polarization splitting unit 07 and the second polarization splitting unit 08 respectively. In the common section 02, the reference section 03 and the detection section 04, the polarization-maintaining optical fiber is used for transmission, respectively, the common section 02 comprises the first common optical fiber 0211 and the second common optical fiber 0212, the reference section 03 comprises the reference optical fiber and the detection section 04 comprises the detection optical fiber. The sensing element 06 capable of causing an optical path difference is disposed on the detection optical fiber 041, the first polarization splitting unit 07 and the second polarization splitting unit 08 may be the polarization couplers. The end of the first common optical fiber 0211 is provide with a first reflecting unit 025, the first reflecting unit 025 specially may be plated with a high reflection film or be provide with a high reflection mirror, the inner side of the high reflection mirror may be provide with a collimated lens, an FBG (Fiber Bragg Grating) device may also be used as the first reflecting unit. The gain medium 05 may be provided on the first common optical fiber 0211, the first common optical fiber 0211 can also be provided with the wavelength division multiplexer 15, the pump light emitted by the pump source 01 passes the wavelength division multiplexer 15 and enters the first common optical fiber 0211 for pumping the gain medium 05. The gain medium 05 may be connected in the first common optical fiber 0211 in the manner of a gain doped fiber, and may also be connected to the first common optical fiber 0211 in the manner of a single gain device.

As one output mode, as shown in FIG. 5, the reference optical fiber 031 and the detection optical fiber 041 are respectively provided with one output coupler as the output unit 09, the emitting optical path of one of the output coupler is provide with the polarization rotation unit 12, the polarization state of the light having passed the polarization rotation unit 12 is the same as the polarization state of the light having passed another output coupler, the two lights passes the light uniting unit 10 to enter the photoelectric detector 11. Meanwhile, the end of the second common optical fiber 0212 is provided with a second reflecting unit 026 of which the structure is identical with the first reflecting unit 025.

As another output mode, as shown in FIG. 6, the output unit 09 may be disposed on the end of the second common optical fiber 0212. Specifically, the end of the second common optical fiber 0212 is provided with the output mirror 091, the emitting optical path of the output mirror 091 is provided with the third polarization splitting unit 21, the third polarization splitting unit 21 may be the polarization splitter, the reflecting optical path of the polarization splitter is provided with a plurality of reflectors 023, the transmission optical path of the polarization splitter is provided with one half-reflecting mirror 24, the light output by the output mirror 091 passes the polarization splitter and is divided into the S light and the P light, the S light is reflected and passes a series of reflectors 023, and has the same polarization state as that of the P light after being changed the polarization state by the polarization rotation unit 12, and finally reaches the half-reflecting mirror 24. The P light directly passes the polarization splitter and reaches the half-reflecting mirror 24, two polarized lights join together at the half-reflecting mirror 24 and generate the interference to be detected by the photoelectric detector 11.

The sensor of this embodiment implements the interference detection through the S light and the P light in the same direction, the principle is the same as that of the above embodiments, and will not be repeated here.

In this embodiment of the present invention, the detection optical fiber 041 and the reference optical fiber 031 may be provided with the adjustable attenuation unit 17, or one of the detection optical fiber 041 and the reference optical fiber 031 may be provided with the adjustable attenuation unit 17; also the reference fiber 031 may be provided with the delay unit 16; also the common optical fiber 021 may be provided with the single frequency acquisition unit 18, or each of the detection optical fiber 041 and the reference optical fiber 031 is provided with the single frequency acquisition unit 18. Each component plays the same role herein as in the above embodiments, which will not be repeated in this embodiment.

Fifth Embodiment

Figure 7:
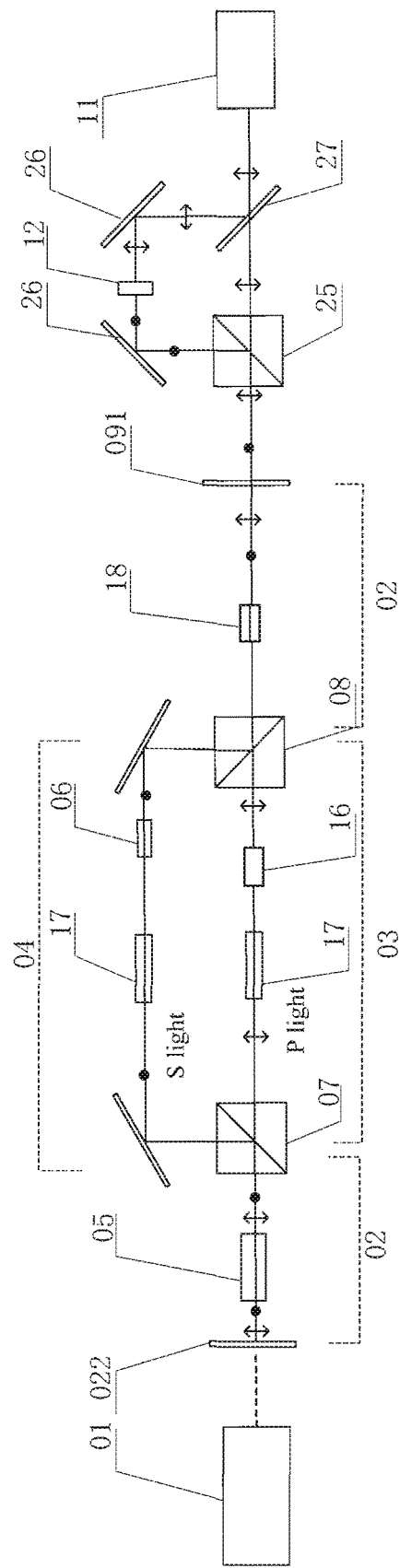
FIG. 7 is a schematic structure view of the sensor based on laser according to the fifth embodiment of the present invention.

The first laser resonator and the second laser resonator in this embodiment are straight cavities. As show in FIG. 7, in first the common section 02, the second common section 02, detection section 04 and reference section 03, the free space is used for transmission. Specifically, the first common section 02 at least the comprises the dichroic mirror 022 and the first polarization splitting unit 07, the gain medium is disposed between the dichroic mirror 022 and the first polarization splitting unit 07, the second common section 02 may comprises the output mirror 091 and the second polarization splitting unit 08. The first polarization splitting unit 07 and the second polarization splitting unit 08 may be the polarization splitter. The reference section corresponds to the transmission optical path between the polarization splitting unit 07 and the second polarization splitting unit 08, the detection section 04 corresponds to the reflecting optical path between the polarization splitting unit 07 and the second polarization splitting unit 08, the sensing element 06 capable of causing an optical path difference is disposed on the detection section 04. The third polarization splitting unit 25 is disposed on one direction of the output mirror 091. The reflecting optical path of the S light of the third polarization splitting unit 25 is provided with a plurality of reflectors 26 and the polarization rotation unit 12, the transmission optical path of the P light of the third polarization splitting unit 25 is provided with the half-reflecting mirror 27, the photoelectric detector 11 is disposed on the emitting direction of the half-reflecting mirror 27. It should be understood that the polarization rotation unit 12 may be disposed on the transmission optical path of the P light.

Certainly, the detection section 04 and the reference section 03 may be provided with the output unit 09, which is not described in this embodiment. In addition, the reference section corresponds to the reflecting optical path between the polarization splitting unit 07 and the second polarization splitting unit 08, the detection section 04 corresponds to the transmission optical path between the polarization splitting unit 07 and the second polarization splitting unit 08.

As described in the above embodiments, in this embodiment, the detection section 04 and the reference section 03 may be provided with the adjustable attenuation unit 17, or one of the detection section 04 and the reference section 03 may be provided with the adjustable attenuation unit 17; also the reference section 03 may be provided with the delay unit 16; the first common section 02 or the second common section 02 may be provided with the single frequency acquisition unit 18, or each of the detection section 04 and the reference section 03 is provided with the single frequency acquisition unit 18. Each component plays the same role herein as in the above embodiments, which will not be repeated in this embodiment.

Sixth Embodiment

Figure 8:
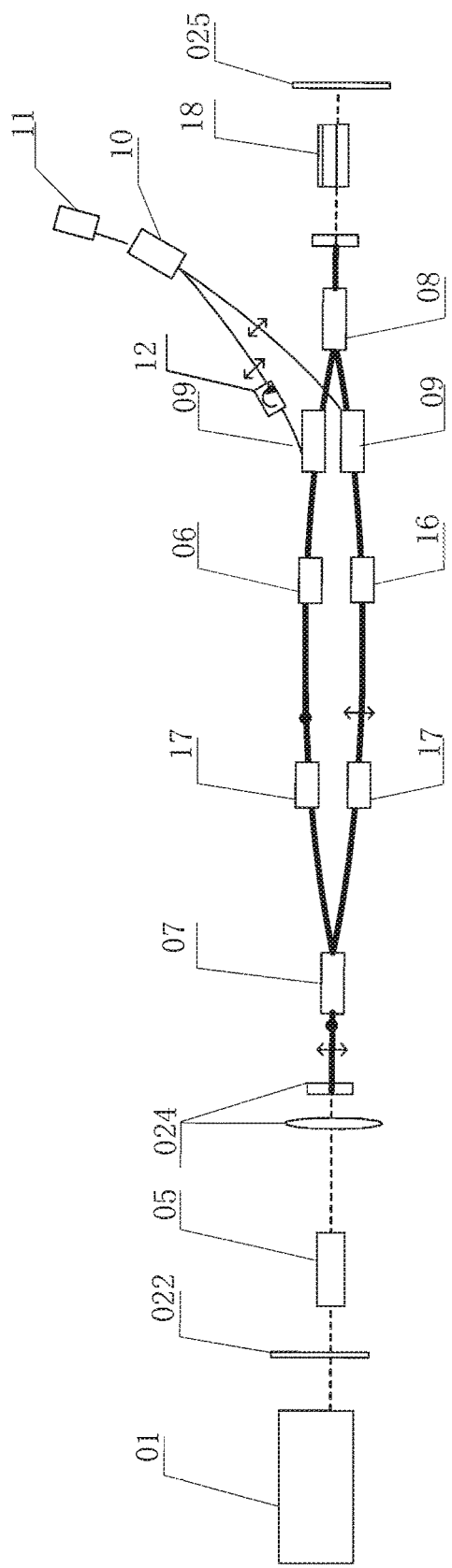
FIG. 8 is a schematic structure view of the sensor based on laser according to the sixth embodiment of the present invention.

The first laser resonator and the second laser resonator in this embodiment are straight cavities. As show in FIG. 8, in first the common section 02, the second common section 02, the free space and the optical fiber are used for transmission, in the detection section 04 and reference section 03, the polarization-maintaining optical fiber comprising the reference optical fiber and the detection optical fiber is used for transmission. Specifically, the first common section 02 comprises the dichroic mirror 022, the collimation focusing mirror group 024 and the first polarization splitting unit 07, the gain medium is disposed on the optical path between the dichroic mirror 022 and the collimation focusing mirror group 024, the pump light emitted by the pump source 01 pass the dichroic mirror 022 to pump and excite the gain medium 05 to emit an excited light. The excited light passes the collimation focusing mirror group 024 and enters a section of the optical fiber, such section of the optical fiber is connected to the first polarization splitting unit 07, the excited light is divided into the S light and the P light by the first polarization splitting unit 07, the S light and the P light respectively enter the reference section 03 and the detection section 04. The second common section 02 comprises the second polarization splitting unit 08, the collimation focusing mirror group 024 and a high reflecting mirror 025, the collimation focusing mirror group 024 is also connected to the second polarization splitting unit 08 through a section of optical fiber. Each of the reference section 03 and the detection section 04 is provided with the output unit 09, the output unit may be the output coupler, and the output coupler is connected to the photoelectric detector 11 through the light uniting unit. The polarization rotation unit 12 is disposed between one of the output coupler and the light uniting unit 10.

In other embodiment, the output mirror may be disposed on the end of the second common section 02 to serve as the output unit 09. The output direction of the output mirror is provided with the third polarization splitting unit. The reflecting optical path of the S light of the third polarization splitting unit is provided with a plurality of reflectors and the polarization rotation unit, the transmission optical path of the P light of the third polarization splitting unit is provided with the half-reflecting mirror. The photoelectric detector is disposed on the emitting direction of the half-reflecting mirror. It should be understood that the polarization rotation unit may be disposed on the transmission optical path of the P light.

In this embodiment, the adjustable attenuation unit 17, the delay unit 16 and the single frequency acquisition unit 18 etc. mentioned above may also be provided and arranged on the corresponding positions, the description will not be repeated in the this embodiment.

In each of the above embodiments, the S light and the P light respectively used as the reference light and the detection light is only for illustration, and the S light may be used as the detection light, and the P light may be used as the reference light. For the output mode, either the polarization maintaining optical fiber or the free space is used for transmission, the output unit 09 may be arranged on the reference section 03 and the detection section 04, and may also be arranged on the common section 02. Therefore, in addition to the specific embodiments mentioned above, the present invention has other embodiments which are not described one by one herein.

In conclusion, the present invention include two straight or ring laser resonators, the two laser resonators may be in the form of a full optical fiber, and may also be in the form of free space, or may be in the form of the combination of the free space and the polarization maintaining optical fiber, the sensing element on the detection section changes the amount of the optical path of the resonator after acted upon by the physical quantity to be measured, thereby changing the frequency of the laser, to obtain the amount of the physical quantity to be measured by detecting the frequency difference of the two lasers. Because the frequency difference is sensitive to changes of the optical path, the sensitivity and the accuracy of the detection is higher, which can't be achieved by the traditional detection methods. Because the two resonators have common optical path, the detection has good stability, good anti-jamming capacity, and suitable for measuring small changes in a variety of physical quantities.

The foregoing descriptions are merely exemplary embodiment of the present invention, but are not intended to limit the present invention to it. Any modification, equivalent replacement, or improvement made without departing from the spirit and principle of the present invention shall fall within the protection scope of the present invention.

What is claimed is:

1. A polarization laser sensor, comprising:
   a pump source;
   a common section;
   a reference section and a detection section which are connected to two ends of the common section in parallel, wherein the common section is provided with a gain medium, and the detection section is provided with a sensing element configured to cause an optical path difference;
   wherein one end of each of the reference section and the detection section is connected to the common section though a first polarization splitting unit, another end of each of the reference section and the detection section is connected to the common section though a second polarization splitting unit;
   the common section and the reference section constitute a first laser resonator transmitting a first linearly polarized light, and the common section and the detection section constitute a second laser resonator transmitting a second linearly polarized light;
   the common section is provided with an output unit or each of the reference section and the detection section is provided with the output unit, the output unit is connected to a photoelectric detector through a light uniting unit, the output unit is configured to output lasers, and are united and transmitted to the photoelectric detector; and a polarization rotation unit configured for the consistency of the polarization states of the first linearly polarized light and the second linearly polarized light, is disposed between the light uniting unit and the output unit.

2. The polarization laser sensor according to claim 1, wherein the common section comprises a first common section and a second common section, the reference section and the detection section are connected between the first common section and the second common section, the first common section, the second common section and the reference section constitute the first laser resonator with straight cavity structure, the first common section, the second common section and the detection section constitute the second laser resonator with straight cavity structure.

3. The polarization laser sensor according to claim 1, wherein the common section and the reference section constitute the first laser resonator which is ring, and the common section and the detection section constitute the second laser resonator which is ring.

4. The polarization laser sensor according to claim 1, wherein in the common section, the reference section and the detection section, a polarization-maintaining optical fiber is used for transmission.

5. The polarization laser sensor according to claim 4, wherein the common section is provided with a wavelength division multiplexer, a pump light output by the pump source passes the wavelength division multiplexer and enters the common section for pumping the gain medium.

6. The polarization laser sensor according to claim 1, wherein in the common section, the reference section and the detection section, a free space is used for transmission, or in the common section, the combination of the free space and the optical fiber is used for transmission, and in the reference section and the detection section, the polarization-maintaining optical fiber is used for transmission.

7. The polarization laser sensor according to claim 6, wherein the common section comprises a dichroic mirror arranged on the output direction of the pump source and a plurality of reflectors forming a free space optical path with the dichroic mirror.

8. The polarization laser sensor according to claim 1, wherein the output unit is disposed on the common section, a third polarization splitting unit is disposed on the output direction of the output unit and is configured to split the light from the output unit into two lights having different polarization directions, the path of one light is provided with the polarization rotation unit.

9. The polarization laser sensor according to claim 1, wherein the output unit is disposed on the common section and comprises two output direction for outputting the linearly polarized lights with different polarization states, a half-reflecting mirror is disposed on one output direction of the output unit and a prism is disposed on the other output direction of the output unit, one of the two output directions is provided with the polarization rotation unit, one linearly polarized light is reflected to the half-reflecting mirror by the prism and enters the light uniting unit together with the other linearly polarized light.

10. The polarization laser sensor according to claim 1, wherein each of the reference section and the detection section is provided with the output unit, the polarization rotation unit is disposed between one output unit and the light uniting unit.

11. The polarization laser sensor according to claim 1, wherein the reference section is provided with a delay unit.

12. The polarization laser sensor according to claim 1, wherein the reference section and/or the detection section is provided with an adjustable attenuation unit.

13. The polarization laser sensor according to claim 1, wherein the common section is provided with a single frequency acquisition unit, or each of the reference section and the detection section is provided with the single frequency acquisition unit.

* * * * *